US012363084B2

(12) United States Patent
Pratt et al.

(10) Patent No.: US 12,363,084 B2
(45) Date of Patent: Jul. 15, 2025

(54) USING A TRANSMISSION PROFILE TO PROVIDE AVAILABILITY AND SECURITY OPTIONS FOR COMMUNICATING DATA

(71) Applicant: AT&T INTELLECTUAL PROPERTY I, L.P., Atlanta, GA (US)

(72) Inventors: James Pratt, Round Rock, TX (US); Yupeng Jia, Austin, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 225 days.

(21) Appl. No.: 17/875,196

(22) Filed: Jul. 27, 2022

(65) Prior Publication Data

US 2024/0039900 A1    Feb. 1, 2024

(51) Int. Cl.
*H04L 9/40* (2022.01)
*H04L 45/302* (2022.01)

(52) U.S. Cl.
CPC ........ *H04L 63/0485* (2013.01); *H04L 45/302* (2013.01)

(58) Field of Classification Search
CPC .......................... H04L 63/0485; H04L 45/302
USPC .......................................................... 713/153
See application file for complete search history.

(56) References Cited

U.S. PATENT DOCUMENTS

| | | | | |
|---|---|---|---|---|
| 7,315,541 B1* | 1/2008 | Housel | ................. | H04L 45/306 370/392 |
| 10,097,448 B1* | 10/2018 | Howard | ............. | H04L 43/0894 |
| 11,310,104 B2 | 4/2022 | Stockert et al. | | |
| 2005/0097357 A1* | 5/2005 | Smith | ................... | H04L 63/083 726/4 |
| 2007/0086339 A1* | 4/2007 | Briggs | ................. | H04L 47/805 370/230 |
| 2008/0080371 A1* | 4/2008 | Liu | ........................ | H04L 45/24 370/230 |

(Continued)

OTHER PUBLICATIONS

"New chip hides wireless messages in plain sight" Princeton University—Electrical and Computer Engineering. Nov. 23, 2021. [https://ece.princeton.edu/news/new-chip-hides-wireless-messages-plain-sight] retrieved Mar. 31, 2023, 3 pages.

*Primary Examiner* — Michael S McNally
(74) *Attorney, Agent, or Firm* — GUNTIN & GUST, PLC; Atanu Das

(57) ABSTRACT

The technologies described herein are generally directed to using a transmission profile to provide availability and security options for communicating data in a fifth generation (5G) network or other next generation networks. For example, a method described herein can include identifying a transmission profile for a data item for transmission to a destination node, with the transmission profile including transmission parameters having an availability importance parameter applicable to an availability of the data item by the destination node and a security importance parameter applicable to a security applicable to transmission. The method can further include segmenting the data item into data segments comprising a first data segment and a second data segment. Further, the method can include, based on the transmission profile, selecting a first network route and a second network route for a transmission of the data segments.

20 Claims, 10 Drawing Sheets

(56) References Cited

U.S. PATENT DOCUMENTS

| | | | |
|---|---|---|---|
| 2008/0101367 A1* | 5/2008 | Weinman | H04L 47/20 |
| | | | 370/392 |
| 2017/0048197 A1* | 2/2017 | Zuk | H04L 47/2441 |
| 2018/0331946 A1* | 11/2018 | Olofsson | H04L 45/22 |
| 2020/0076527 A1* | 3/2020 | Williams | H04J 14/0258 |
| 2022/0210012 A1 | 6/2022 | Stockert et al. | |
| 2024/0223583 A1* | 7/2024 | Pasini | H04L 63/1416 |

* cited by examiner

USING A TRANSMISSION PROFILE TO PROVIDE AVAILABILITY AND SECURITY OPTIONS FOR COMMUNICATING DATA

TECHNICAL FIELD

The subject application is related to different approaches to handling communication in networked computer systems and, for example, to provide different availability and security options for communicating different types of data.

BACKGROUND

Network connectivity continues to evolve away from single connected endpoints and communication channels. While wireless slicing in new protocols like 5G may be arising, problems can occur with data availability and security, e.g., based on different channels, operators, security, and priority. These problems are aggravated by the increasing variety of available types of network connections and data to be transmitted.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
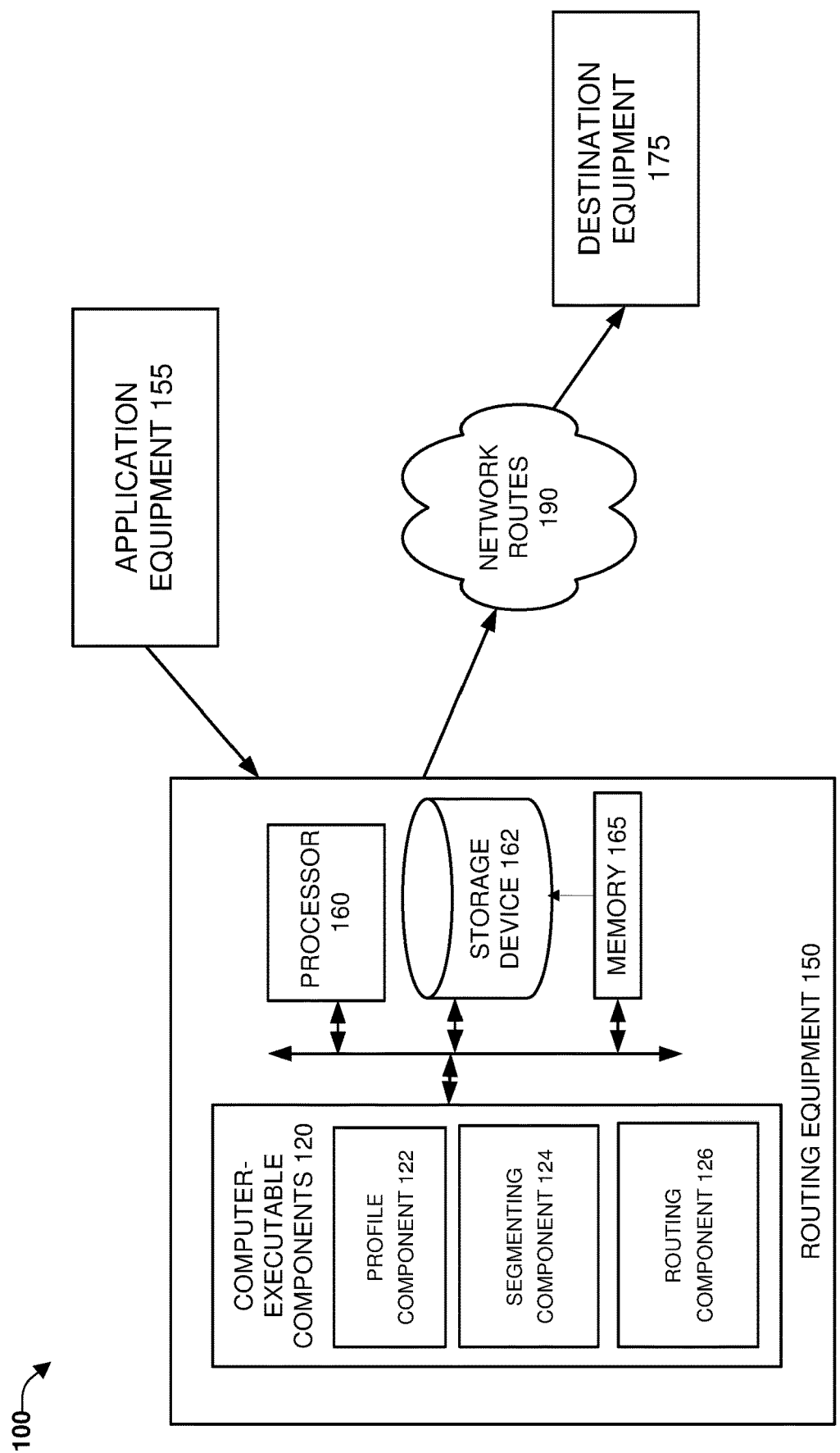
FIG. 1 is an architecture diagram of an example system that can facilitate using a transmission profile to customize availability and security options for communicating application data, in accordance with one or more embodiments.

Generally speaking, one or more embodiments of a system described herein can facilitate using a transmission profile to provide availability and security options for communicating data. In addition, one or more embodiments described herein can be directed towards enabling an application to label network data to specify different routing and encryption options for transmission. One or more embodiments can provide benefits including, system robustness, reduced overhead, increased performance, increase security, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any radio access technology (RAT) or multi-RAT system where the UEs operate using multiple carriers, e.g., LTE.

One having skill in the relevant art(s), given the disclosure herein understands that the computer processing systems, computer-implemented methods, equipment (apparatus) and/or computer program products described herein employ hardware and/or software to solve problems that are highly technical in nature (e.g., evaluating and managing different network transmission characteristics for different types of data), that are not abstract and cannot be performed as a set of mental acts by a human. For example, a human, or even a plurality of humans, cannot efficiently perform complex network routing and rerouting and adjust different levels of encryption, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate using a transmission profile to provide availability and security options for communicating data. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate using a transmission profile to customize availability and security options for communicating application data, in accordance with one or more embodiments. For purposes of brevity, description of like elements and/or processes employed in other embodiments is omitted. As depicted, system 100 includes routing equipment 150 receiving data from application equipment 155 and communicating the data to destination equipment 175 via network routes 190.

Routing equipment 150 can include computer executable components 120, processor 160, storage device 162 and memory 165. Computer executable components 120 can include profile component 122, segmenting component 124, routing component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, routing equipment 150, application equipment 155, and destination equipment 175 can comprise various computer and/or computing-based elements described herein with reference to mobile handset 900 of FIG. 9, and operating environment 1000 of FIG. 10. For example, one or more of the different functions of routing equipment 150 can be divided among various equipment, including, but not limited to equipment at a central node global control located on the core Network, e.g., mobile edge computing (MEC), self-organized networks (SON), or RAN intelligent controller (RIC) network equipment.

Figure 2:
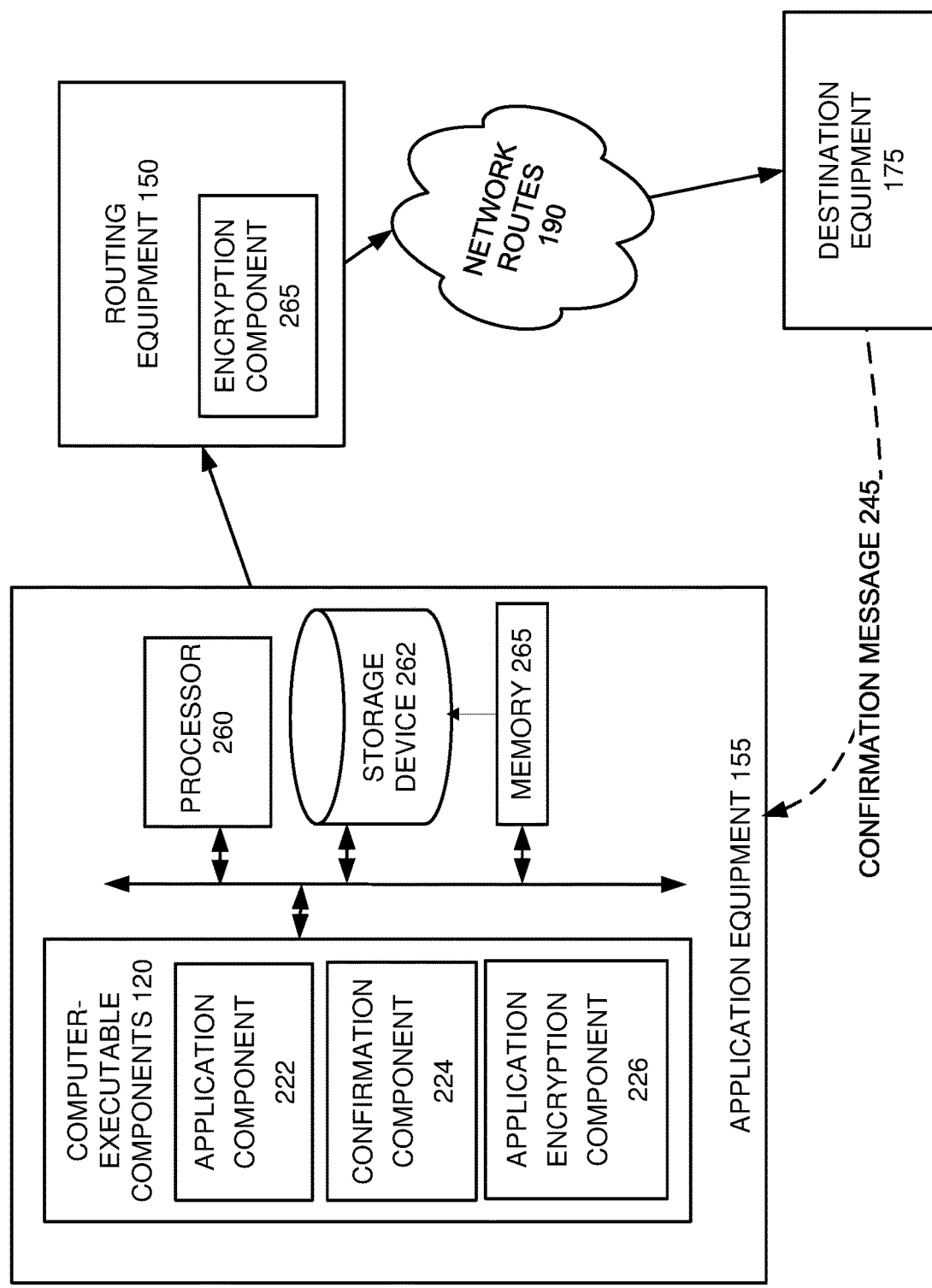
FIG. 2 is a diagram of a non-limiting example system that can enable an application to label network data to specify different routing and encryption options for transmission, in accordance with one or more embodiments.

In addition, although FIGS. 1 and 2 depict routing equipment 150 as relaying data from application equipment 155 to destination equipment 175, this orientation is non-limiting, with routing equipment 150 functions being used to provide guiding instructions to different starting points (e.g., application equipment 155 or other network routing equipment) to facilitate communication to destination equipment 175.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining profile component 122. As discussed further below, profile component 122 can, in accordance with one or more embodiments, identify a transmission profile for a data item for transmission to a destination node via a network, with the transmission profile including transmission parameters having an availability importance parameter applicable to an availability of the data item by the destination node and a security importance parameter applicable to a security applicable to transmission. For example, one or more embodiments can identify a transmission profile for a data item provided by application equipment 155 for transmission to destination equipment 175 via network routes 190.

As described with different examples herein, the transmission profile used for particular data to be communicated can include one or more of the parameters discussed below, e.g., a data security importance parameter and data availability importance parameter can be applied to data as discussed below. Both these importance levels can influence the selection of different transmission characteristics including, but not limited to, segment size, route selection, level of encryption used, and amount of delivery verification applied. Other aspects of transmission profiles are discussed with additional examples provided below.

As used with some non-limiting examples discussed herein, data availability importance can describe the relative importance that is assigned to data being available at a required level of performance (e.g., latency) in circumstances ranging from normal operation to recovery operations after equipment failure. Considered broadly, one having skill in the relevant art(s), given the description herein understands that, as used by some embodiments described herein, processes such as data replication for sending down multiple network paths in parallel can improve both recovery availability (e.g., if one path goes down, other paths can deliver the data) and performance availability, e.g., sending segments of data on multiple paths can increase the speed of the data transmission, thereby reducing data latency. Additional data availability examples are provided with FIGS. 3-4 below.

As used with some non-limiting examples discussed herein, data security can reference concepts different from data availability. Broadly considered, data security importance can describe the relative importance that is assigned to data being unavailable to unauthorized entities. In some embodiments described herein, data security can be improved by dividing data into multiple segments for transmission on different network routes, e.g., reducing the likelihood that all of the data is available by the compromise of system components. In addition, the degree to which encryption of transmitted data is used can affect system security. Additional security examples are provided with FIGS. 3-4 below.

Further, in another example, in one or more embodiments, computer executable components 120 can include instructions that, when executed by processor 160, can facilitate performance of operations defining segmenting component 124. As discussed with FIGS. 3-4 below, segmenting component 124 can, in accordance with one or more embodiments, segment the data item into data segments comprising a first data segment and a second data segment. For example, in different implementations, one or more embodiments can segment the data item into data segments comprising a first data segment and a second data segment. Segment size and segment routing are discussed further with FIGS. 3-4 below.

In yet another example, computer executable components 120 can include instructions that, when executed by processor 160, can facilitate performance of operations defining routing component 126. As discussed herein, in one or more embodiments, routing component 126 can, based on the transmission profile, select a first network route and a second network route for a transmission of the data segments. Example routing strategies that can be used to promote different availability and security characteristics of network communication are discussed with FIGS. 3-4 below.

FIG. 2 is a diagram of a non-limiting example system 200 that can enable an application to label network data to specify different routing and encryption options for transmission, in accordance with one or more embodiments. For purposes of brevity, description of like elements and/or processes employed in other embodiments is omitted. As depicted, system 200 can include application equipment 155 connected to routing equipment 150 for transmission of data between application equipment 155 and destination equipment 175 via network routes 190. Destination equipment 175 can provide confirmation message 245 to application equipment 155. To illustrate additional features of one or more embodiments, routing equipment 150 includes encryption component 265.

In one or more embodiments, application equipment 155 can include memory 265 that can store one or more computer and/or machine readable, writable, and/or executable components and/or instructions 220 that, when respectively executed by processor 260, can facilitate performance of operations defined by the executable component(s) and/or instruction(s).

In system 200, computer executable components 220 can include application component 222, confirmation component 224, application encryption component 226, and other components described or suggested by different embodiments described herein that can improve the operation of system 200. For example, in some embodiments, application equipment 155 can further comprise various computer and/or computing-based elements described herein with reference to mobile handset 900 of FIG. 9 and operating environment 1000 described with FIG.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining application component 222. In one or more embodiments, application component 222 can send, to a routing controller device, content data representative of content, device data representative of a destination device, and profile data representative of a routing profile for the content data comprising a data protection value applicable to protection of the content data and a data replication value applicable to replication of the content data.

In another example, in one or more embodiments, computer executable components 220 can include instructions that, when executed by processor 260, can facilitate performance of operations defining confirmation component 224. In one or more embodiments, confirmation component 224 can receive a confirmation message 245 from the routing controller device that the content data was divided into data portions that were communicated to the destination device via network routes selected based on the routing profile.

In one or more embodiments the data item can include an application label that identifies requirements of the application that provided the data item, and this information can be used both to select a transmission profile and, after a profile is selected, implement different requirements of the profile.

In one or more embodiments, data items can be labeled by application component 222 to specify different requirements for the data transmission, e.g., security level, maximum latency. Based on this labeling various interfaces and data types of the application component 222 can have different requirements maintained, e.g., for background data, video communication, and control channels.

In some implementations of application component 222, security procedures can be set and implemented by application logic, e.g., application encryption component 226 and other procedures. It should be noted that one or more embodiments can supplement or replace aspects of the security provided by application component 222, e.g., by implementing variable security procedures in accordance with the specifics of network routes 190. For example, as discussed with FIG. 3 below, embodiments can implement different encryption levels (e.g., by encryption component 265) based on the conditions of the network routes 150 selected. Stated differently, one or more embodiments can migrate certain security functions from network node equipment (e.g., application equipment 155) to network routing equipment, e.g., routing equipment 150.

Figure 3:
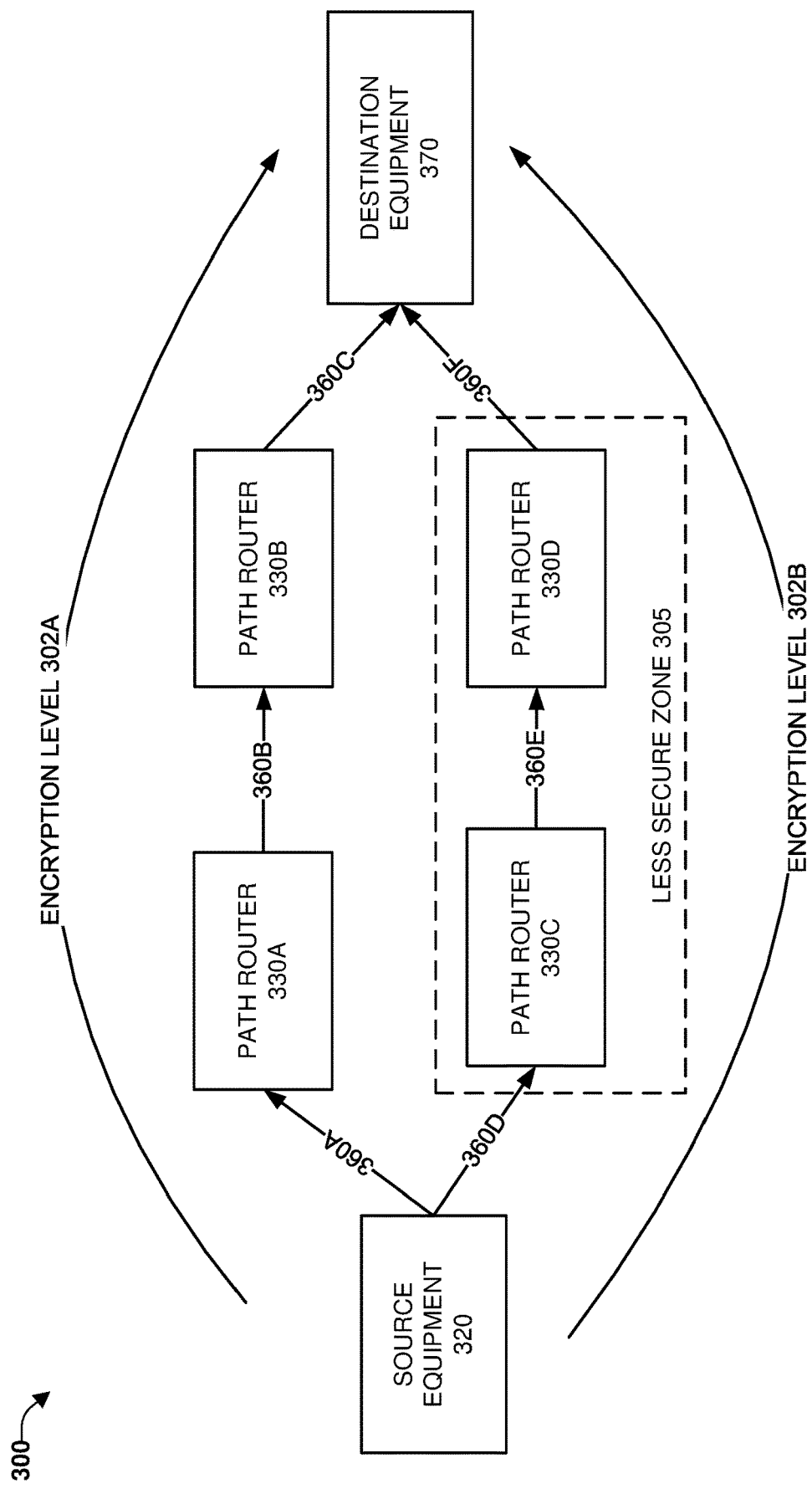
FIG. 3 is a diagram of a non-limiting example system that can facilitate using a transmission profile to provide availability and security options for communicating data, in accordance with one or more embodiments.

FIG. 3 is a diagram of a non-limiting example system 300 that can facilitate using a transmission profile to provide availability and security options for communicating data, in accordance with one or more embodiments. For purposes of brevity, description of like elements and/or processes employed in other embodiments is omitted. As depicted, system 300 shows source equipment 320 and destination equipment 370 connected by two example paths that include path routers 330A-B and path routers 330C-D, respectively. The first path included connections 360A-C and the second path includes connections 360D-F in less secure zone 305 than the first path. Encryption level 302A is applied to the data of the first path and encryption level 302B encryption level 302B applies to the second path.

It should be noted that while path routers 330A-D are used to illustrate example network routes that can be discovered, mapped, and utilized by embodiments, this examples are non-limiting, with embodiments broadly working with a variety of different networks to route the segments described herein. For example, one or more embodiments can connect to multiple communication networks to aggregate available channels, e.g., the first path above can be elements of an edge network for wireless devices and the second path can include fiber backhaul network connections. Just as the networks handled by embodiment can be diverse, one or more embodiments can work with a variety of different types of information with different security, latency, and replication requirements, e.g., SMS messages, streaming video, ultra-low latency applications for unmanned vehicles, and other 5G and earlier generation communication types.

Returning to FIG. 3, one or more embodiments can, based on the transmission profile, divide data to be transmitted into segments and then route the data segments to be via both the first network route with connections 360A-C and the second network route with connections 360D-F. To provide some of the benefits described herein, routing of the segments be performed with reference to different parameters, e.g., the availability importance parameter and the security importance parameter, as noted above. Additional factors can include availability, proximity, and capabilities that can improve transmission of particular data types, e.g., some high-speed devices enable multiple transactions in a bus interval, such as a user datagram protocol (UDP) burst transmission.

In an example, based on a sample transmission profile where the security importance parameter has a value above a security threshold of importance, the divided data can be set via the different routes, e.g., with a first segment on the first route and a second segment on the second route, to be rejoined and verified be embodiments of destination equipment 370. As noted above, this separation can improve security by reducing a likelihood that an entire set of data can be intercepted. Similarly, in another example, based on a sample transmission profile where the availability parameter has a value above an availability threshold of importance, the divided data can be replicated and sent via both the first and second route. As is understood by one having skill in the relevant art(s), given the description herein, with combinations of different parameters, one or more embodiments can select parameter combinations to achieve a variety of results.

When considering the discovery, mapping, and use of network routes, it is important to note that one or more embodiments can continuously evaluate different characteristics of individual and collected components to maintain the efficacy of the transmission routing approaches. For example, as depicted in FIG. 3, a portion of the second network route (e.g., path router 330C to path router 330D via connection 360E) can be evaluated to be a less secure zone 305 than the first route, e.g., the route includes a publicly accessible network portion or a portion of a network maintained by a different carrier. Once discovered, data about different routes can be cached, updated, and reused as needed. One or more embodiments can discover routes from multiple operators (e.g., local networks, high security networks, and home networks), utilizing developing 5G and later generation protocols, specifications, and multi-SIM capabilities. To handle the variety of network portions, one or more embodiments can aggregate performance metrics for throughput and packet traversal security risk.

When the predicted security characteristics of a network route are combined with the security importance parameter discussed above, an encryption level can be selected to applied at one or more of the connections and devices on the routes, e.g., a higher level of encryption for the entire second route or just for less secure zone 305 noted. Additionally, it is important to note that, with application labeling for example, different portions of the data being transmitted can have different designated security levels, with embodiments flexibly applying different encryption levels to different segments, e.g., at the operator level so as to spread across different subscriber identity modules (SIMs) or networks. Application data can also be labeled as having different priority levels for use by embodiments.

Figure 4:
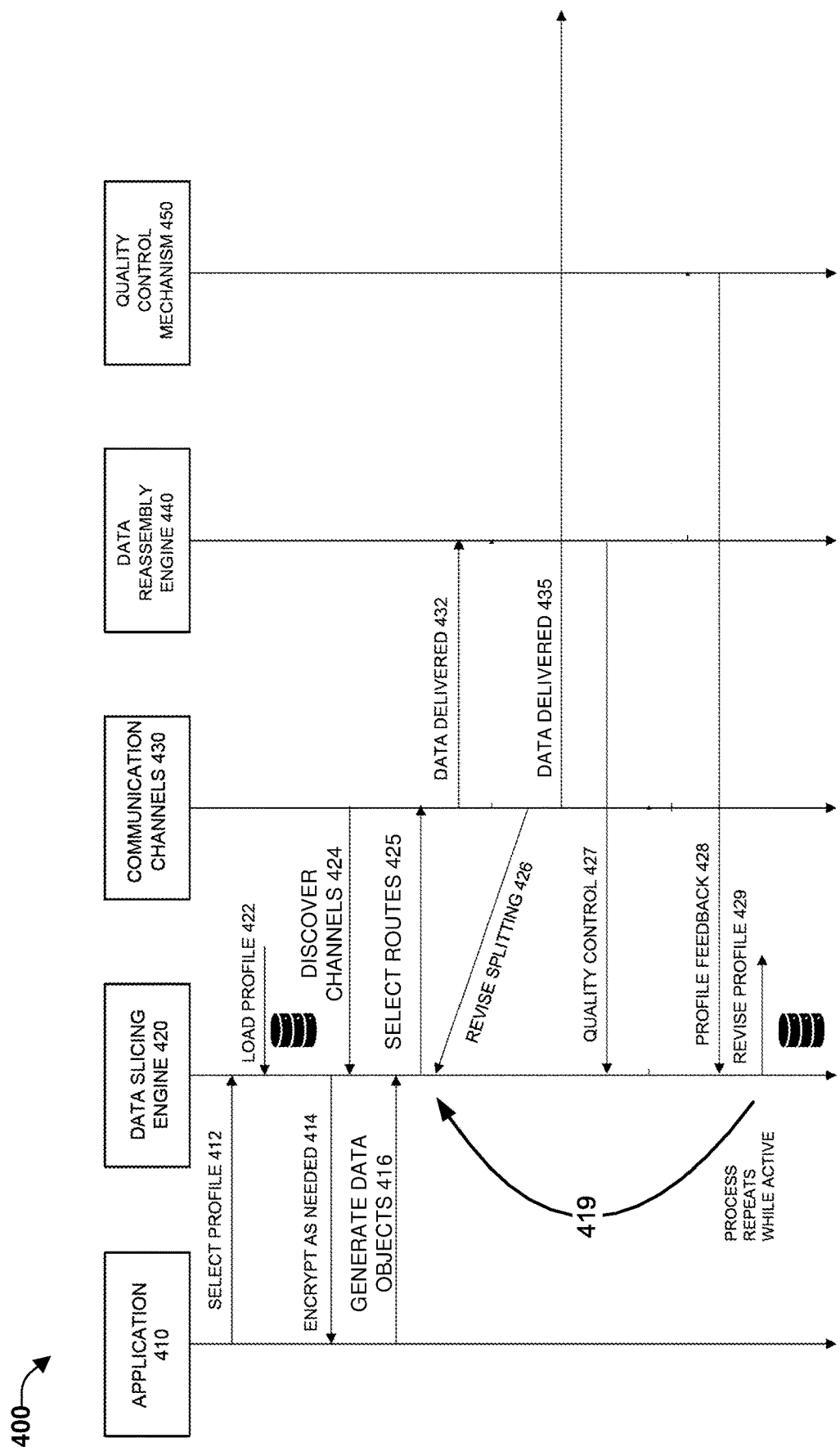
FIG. 4 depicts a communication diagram of an example process that can facilitate using a transmission profile to provide availability and security options for communicating data, in accordance with one or more embodiments.

FIG. 4 depicts a communication diagram of an example process 400 that can facilitate using a transmission profile to provide availability and security options for communicating data, in accordance with one or more embodiments. For purposes of brevity, description of like elements and/or processes employed in other embodiments is omitted.

As depicted, application 410, data slicing (segmenting) engine 420, communication channels 430, data reassembly engine 440, and quality control mechanism 450 can exchange information, in accordance with one or more embodiments. At 412, a transmission (routing) profile can be selected and at 422 the profile can be loaded from stored resources. At 424, communication channels 430 can be discovered as discussed above. At 414, in accordance with the selected profile, data from application 410 can be encrypted as needed and at 416, the data objects to be transmitted can be generated.

Once generated, in accordance with the selected profile, data slicing engine 420 can segment the data for transmission. In one or more embodiments, inter-packet splitting of data can occur at application 410 and at network devices. In one or more embodiments, splitting can be delegated to other or additional splitting or replication can occur, e.g., while interfacing with one or more operators, to maintain some performance requirements, additional operator repeating or bursting may be specified.

At 425, based on the discovered communication channels, routes can be selected for transmission to destination equipment 370. At 426, splitting approach (and other settings) can be revised based on analysis to adjust results, with the adjusted segments being delivered at 435. It should be noted that although a single information provider is depicted in FIGS. 1 and 2 (e.g., application equipment 155), data that has been split by embodiments (e.g., into packets, segments, or other units described herein), can be flexibly combined for routing with packets from other data providers. By routing, segment labeling, and other approaches described or suggested herein, one or more embodiments can enable multiple data consuming nodes (e.g., destination equipment 175) to consume all or some portions of segments of data from multiple data providing nodes. Stated differently, one or more embodiments can enable the consumption by data consumers of portions of segments (e.g., also termed chunks herein) from multiple data providers.

At 427, in accordance with the transmission profile, different levels of quality control can be applied, e.g., based on the availability importance parameter and other factors such as application 410 labeling. At 428, feedback can be provided for revision of the profile, and at 429, the profile can be revised.

Based at least on the foregoing, one or more embodiments can provide different benefits, including but not limited to, allowing end users to conduct information transfer more securely or faster, securely splitting/assembling messages with a priority for some traffic (e.g. gaming, Internet of Things (IoT) devices, use of multiple slices for the device to react based on its real time need on the network (gamers can switch to faster slice or aggregated multiple slices via upgrading to boost gaming experience, reducing power consumption by endpoint devices because packet decryption needs can be reduced, dynamic adjustment of network, edge, device calculation of data/packet based upon end user's need and context, allowing users to opt-in and select to different networks as determined by an application's security or timing requirements (e.g., some secure mail applications can require that users distribute across at least three networks).

One or more embodiments can be applied to electrical charging of devices as well, e.g., embodiment can be applied to determining flow of energy packets from one or more different charging sources; allows packet delivery (e.g., energy) to be routed over optical or wireless charging in advantageous ways.

Figure 5:
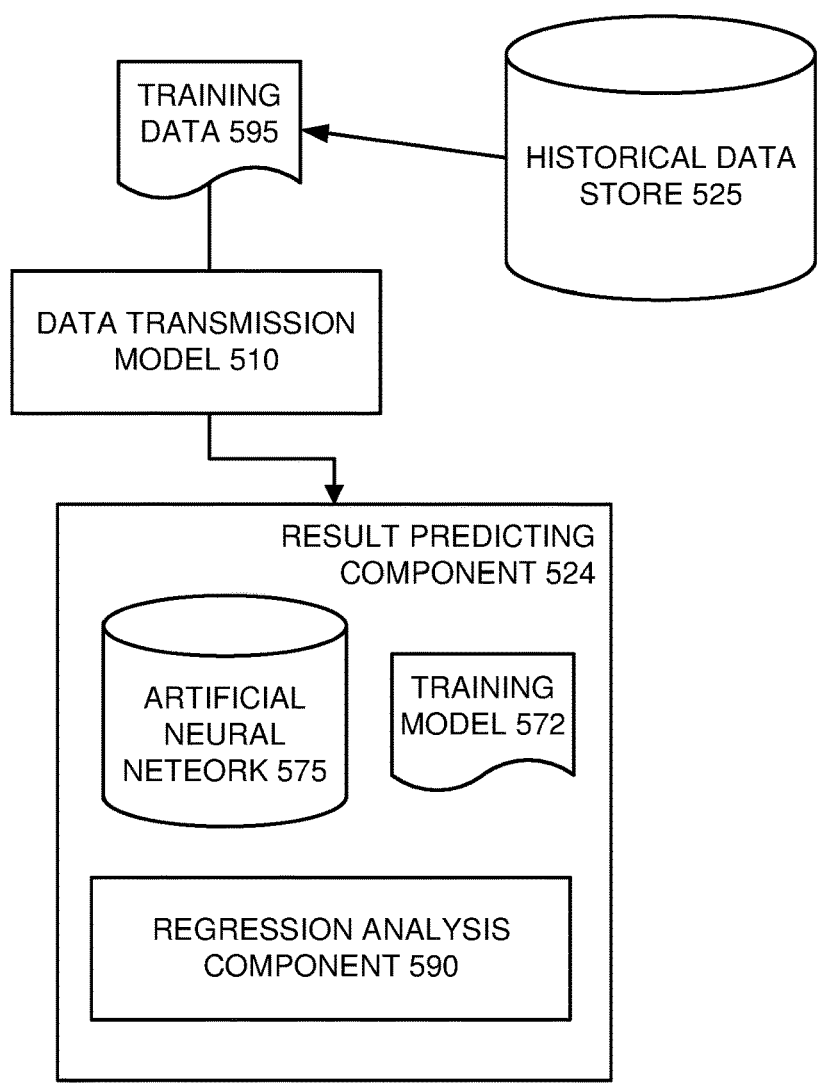
FIG. 5 illustrates an implementation of an example, non-limiting system that can facilitate using machine learning to improve discovery of network routes and transmission profiles for communicating data, in accordance with one or more embodiments.

FIG. 5 illustrates an implementation of an example, non-limiting system 500 that can facilitate using machine learning to improve discovery of network routes and transmission profiles for communicating data, in accordance with one or more embodiments. Repetitive description of like elements and/or processes employed in respective embodiments is omitted for sake of brevity. As depicted, system 500 can comprise result predicting component 524, historical data store 525, training data 595, and data transmission model 510. Result predicting component 524 in this example can comprise artificial neural network (ANN) 575, ANN training model 572, and regression analysis component 590.

One or more embodiments can use machine learning to improve profile handling of data based on previous applications of similar profiles for similar use cases. For example, one or more embodiments can apply machine learning to data metadata (e.g., labeled requirements from application, throughput, connection lifetime, etc.). One or more embodiments can also apply machine learning to discovery, mapping, and selection of available channels (e.g., historical performance of a channel, channel self-rating, and other factors discussed above). In additional or alternative embodiments, machine learning can be used for setting stream parameters for processes including adaptively sending different stream volumes.

In certain embodiments, different functions of result predicting component 524 can be facilitated based on classifications, correlations, inferences and/or expressions associated with principles of artificial intelligence and machine learning. For example, result predicting component 524 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, comprising deep neural networks (DNN), reinforcement learning (RL), Bayesian Statistics, long short-term memory (LSTM) networks. One or more of the above approaches can be specified in data transmission model 510 can be used by result predicting component 524 to analyze one or more sources of network usage information discussed above.

In an example embodiment, the historical data store 525 can be comprised in information stored in ANN 575, that was trained by historical information associated with the routing equipment 150. In additional embodiments, initial and subsequent training of ANN 575 can be based on collected production data stored in historical data store 525 that has been divided into training data 595 in a first data portion and optimizing data (e.g., testing, validation) in a second portion of data. In different approaches, these portions can be selected based on different approaches that comprise, but are not limited to, a random or pseudorandom selection process.

As would be appreciated by one having skill in the relevant art(s), given the description herein, different aspects of network data records (e.g., results of one or more embodiments with respect to interference by certain bandwidths) can be used to train ANN 575. Example values that can be assessed comprise, bandwidth utilization, quality of service metrics such as key performance indicators (KPIs) and key quality indicators (KQI), performance and configuration data collected by UE/eNodeB, along with different scenarios of interference detected and reported.

As would be appreciated by one having skill in the relevant art(s), given the description herein, after training by the first portion of data, the second portion of data, analysis results for the data, can be used to validate and update ANN 575, if needed. It should be noted that this description of employing an ANN is non-limiting, e.g., one or more embodiments can use other types of artificial intelligence and machine learning algorithms that receive input and perform capacity analysis as described above.

In another approach, machine learning (supervised learning) based solutions to analyze the types of data described above to generate predicted interference by different bands. As would be appreciated by one having skill in the relevant art(s), given the description herein, regression analysis component 590 can be used to apply a regression analysis approach to machine learning for embodiments, e.g., this approach being useful in some circumstances for analyzing data to generate different improved solutions to a problem.

Figure 6:
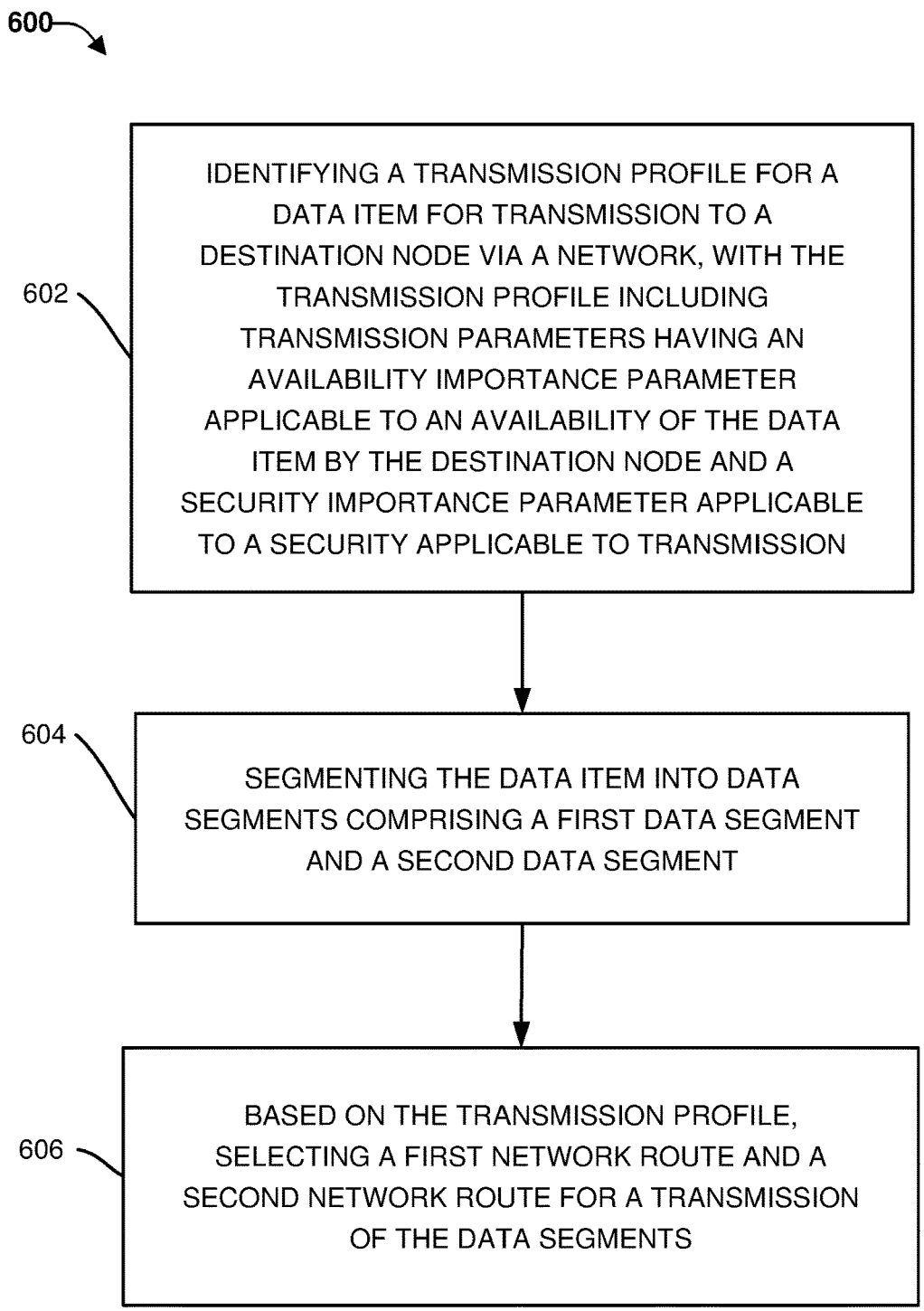
FIG. 6 illustrates an example method that can facilitate using a transmission profile to provide availability and security options for communicating data, in accordance with one or more embodiments.

FIG. 6 illustrates an example method 600 that can facilitate using a transmission profile to provide availability and security options for communicating data, in accordance with one or more embodiments. For purposes of brevity, description of like elements and/or processes employed in other embodiments is omitted.

At 602, method 600 can include identifying a transmission profile for a data item for transmission to a destination node via a network, with the transmission profile including transmission parameters having an availability importance parameter applicable to an availability of the data item by the destination node and a security importance parameter applicable to a security applicable to transmission. At 604, method 600 can further include segmenting the data item into data segments comprising a first data segment and a second data segment. At 606, method 600 can include, based on the transmission profile, selecting a first network route and a second network route for a transmission of the data segments.

Additional or alternative embodiments of the method can further include, based on the transmission profile, routing, by the routing equipment, the first data segment to be transmitted via the first network route and the second data segment to be transmitted via the second network route.

In additional or alternative embodiments, the routing can be based on the security importance parameter being determined to have an importance value above an availability threshold of importance.

Additional or alternative embodiments of the method can further include, identifying, by the routing equipment, a security level of the first network route, and based on the security level, selecting, by the routing equipment, an encryption level for selected data segments of the data segments that were selected to be transmitted via the first network route.

In additional or alternative embodiments, the encryption level was selected further based on the security importance parameter.

Additional or alternative embodiments of the method can further include, based on the transmission profile, routing, by the routing equipment, the data segments to be transmitted via both the first network route and the second network route.

In additional or alternative embodiments, the routing can be based on the availability importance parameter being determined to have an importance value above an availability threshold of importance.

In additional or alternative embodiments, the availability importance parameter can include a latency importance parameter.

In additional or alternative embodiments, the availability importance parameter can include a recovery importance parameter applicable to recovery of network resources usable for transmission.

In additional or alternative embodiments, segmenting the data item into the data segments can include selecting a size for the first data segment based on the transmission profile.

In additional or alternative embodiments, the transmission profile was identified based on historical performance data for other data items determined to be similar to the data item.

In additional or alternative embodiments, the data item further can include an application label that identifies an application related to the data item, and wherein the transmission profile was identified based on the application label.

In additional or alternative embodiments, based on the application label, the transmission profile can include a first transmission parameter of the transmission parameters applicable to the first data segment that can be different from a second transmission parameter of the transmission parameters applicable to the second data segment.

In additional or alternative embodiments, the transmission profile can include a verification procedure to be applied by the destination node to verify the transmission of the data segments.

In additional or alternative embodiments, the verification procedure can be selected based on the availability importance parameter of the transmission profile.

In additional or alternative embodiments, the transmission profile further can include a priority value for the data item.

Figure 7:
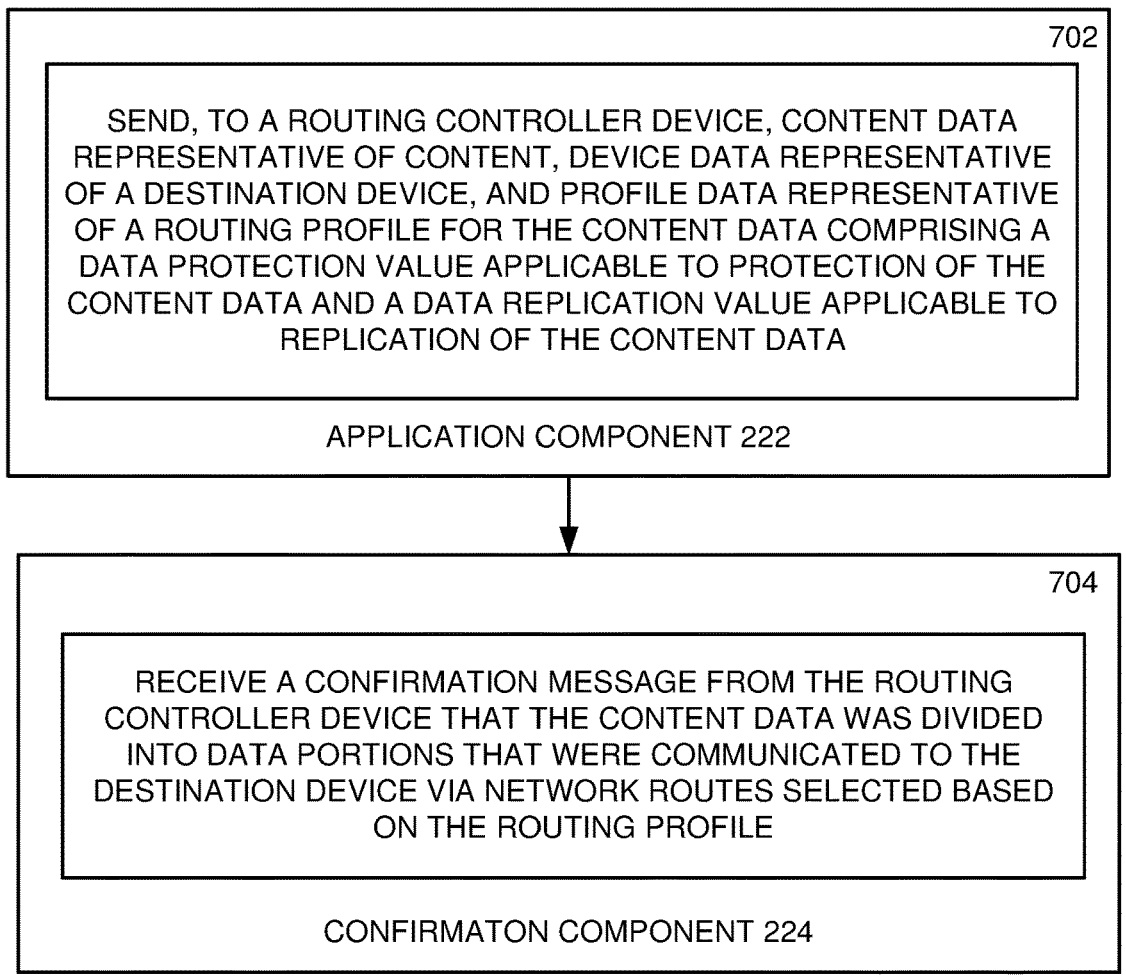
FIG. 7 depicts a system that can facilitate using a transmission profile to provide availability and security options for communicating data, in accordance with one or more embodiments.

FIG. 7 depicts a system 700 that can facilitate using a transmission profile to provide availability and security options for communicating data, in accordance with one or more embodiments. For purposes of brevity, description of like elements and/or processes employed in other embodiments is omitted. As depicted, system 700 can include application component 222, confirmation component 224, and other components described or suggested by different embodiments described herein, that can improve the operation of system 700.

In an example, component 702 can include the functions of application component 222, supported by the other layers of system 700. For example, component 702 can send, to a routing controller device, content data representative of content, device data representative of a destination device, and profile data representative of a routing profile for the content data including a data protection value applicable to protection of the content data and a data replication value applicable to replication of the content data.

In this and other examples, component 704 can include the functions of confirmation component 224, supported by the other layers of system 700. Continuing this example, in one or more embodiments, component 704 can receive a confirmation message from the routing controller device that the content data was divided into data portions that were communicated to the destination device via network routes selected based on the routing profile.

In additional or alternative embodiments, the data portions can be distributed to the network routes based on the data protection value and the data replication value, and the redundancy of the transmission of the data portions can be based on the data replication value and data encryption of the data portions was based on the data protection value.

Figure 8:
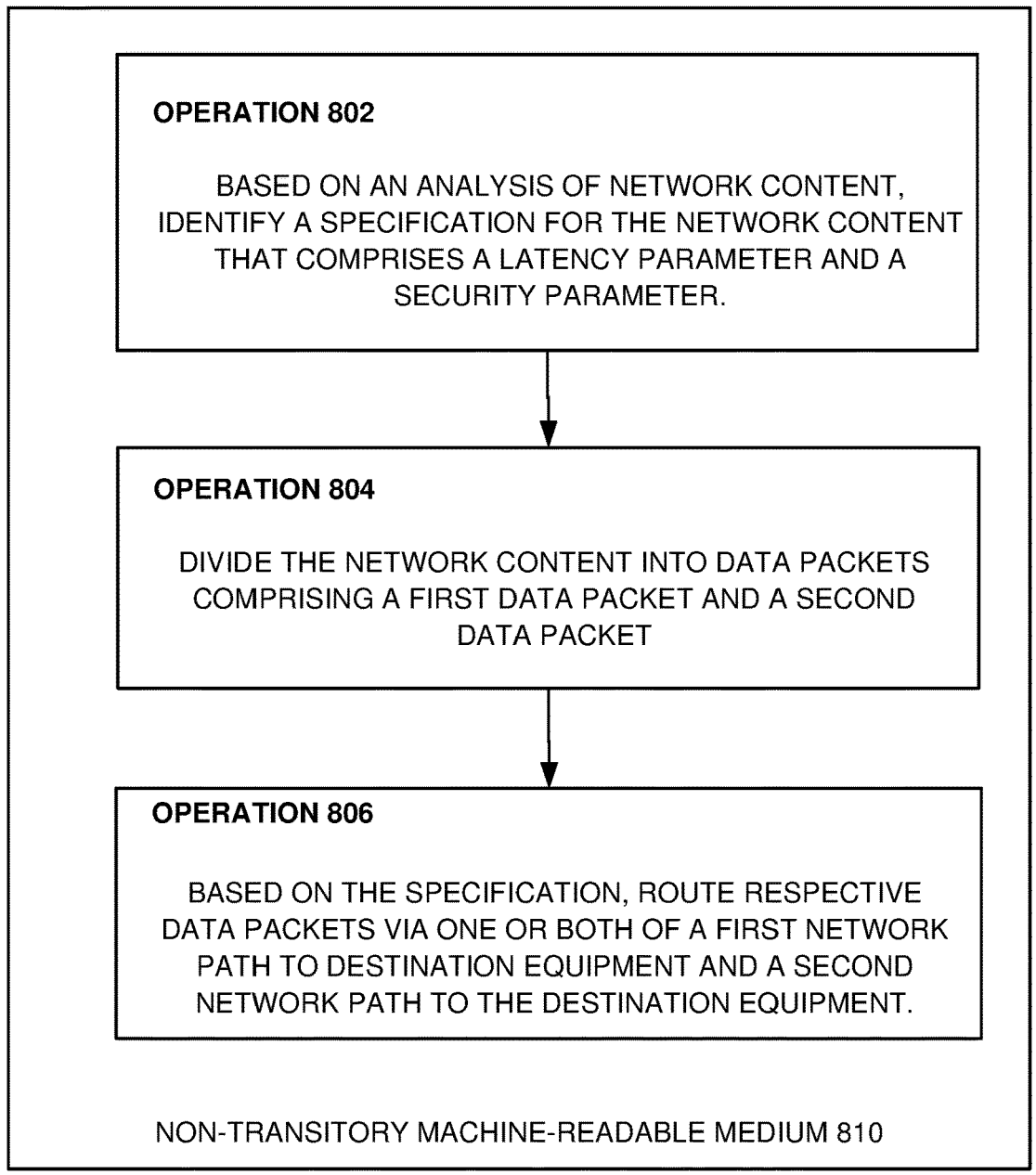
FIG. 8 depicts an example non-transitory machine-readable medium that can include executable instructions that, when executed by a processor of a system, facilitate using a transmission profile to provide availability and security options for communicating data, in accordance with one or more embodiments described herein.

FIG. 8 depicts an example 800 non-transitory machine-readable medium 810 that can include executable instructions that, when executed by a processor of a system, facilitate using a transmission profile to provide availability and security options for communicating data, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can, based on an analysis of network content, identify a specification for the network content that comprises a latency parameter and a security parameter.

Operations can further include operation 804, that can divide the network content into data packets comprising a first data packet and a second data packet.

Example operations can further include operation 806, that can, based on the specification, route respective data packets via one or both of a first network path to destination equipment and a second network path to the destination equipment.

In additional or alternative embodiments, the routing can include, based on the security parameter, encrypting the respective data packets based on a specified encryption rate, and based on the latency parameter and an estimated transmission speed of the first network path, selecting the first network path for the routing of the respective data packets.

Figure 9:
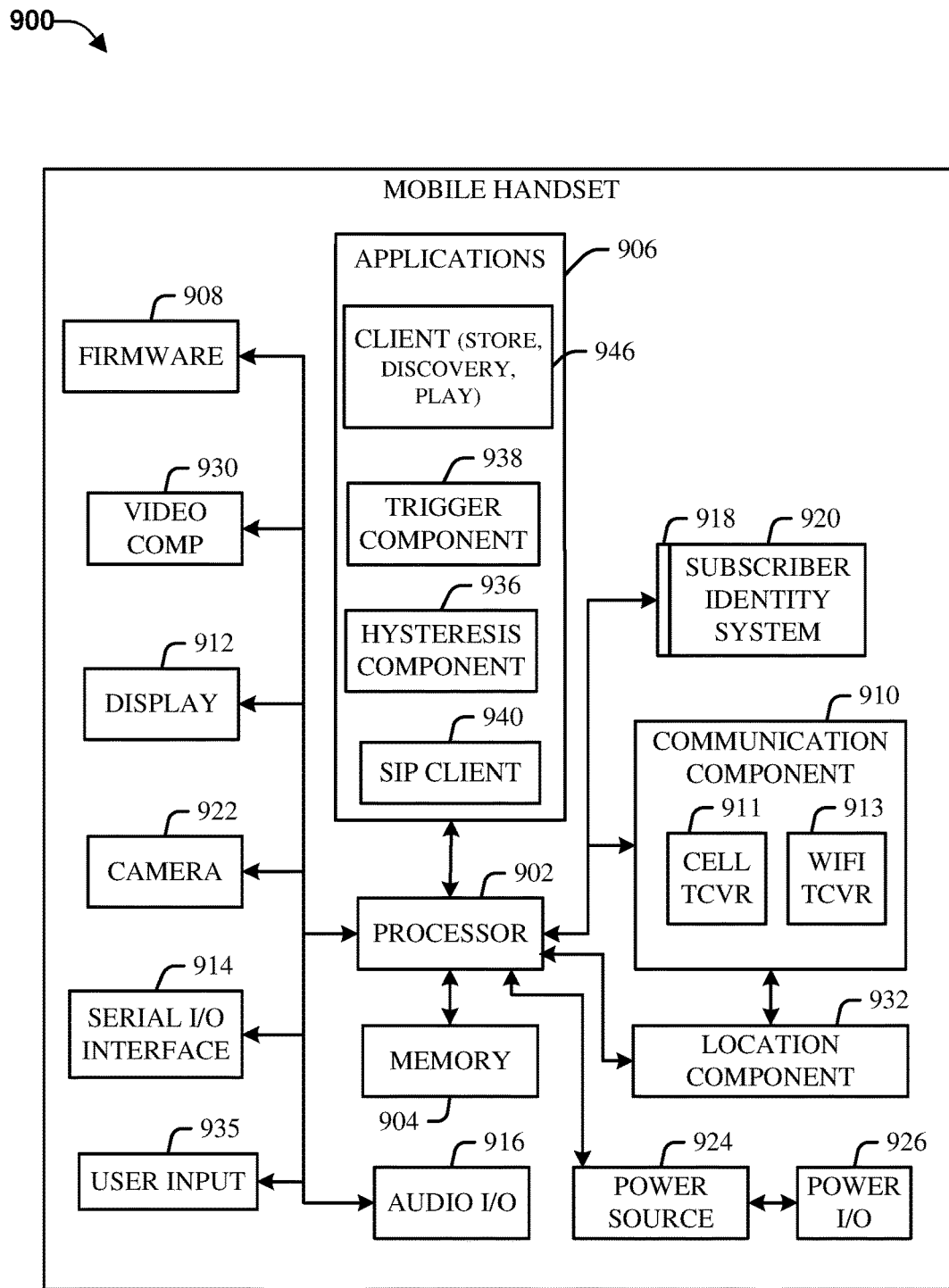
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network routes 190 can broadly employ various systems, technologies, and modulation schemes to facilitate communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
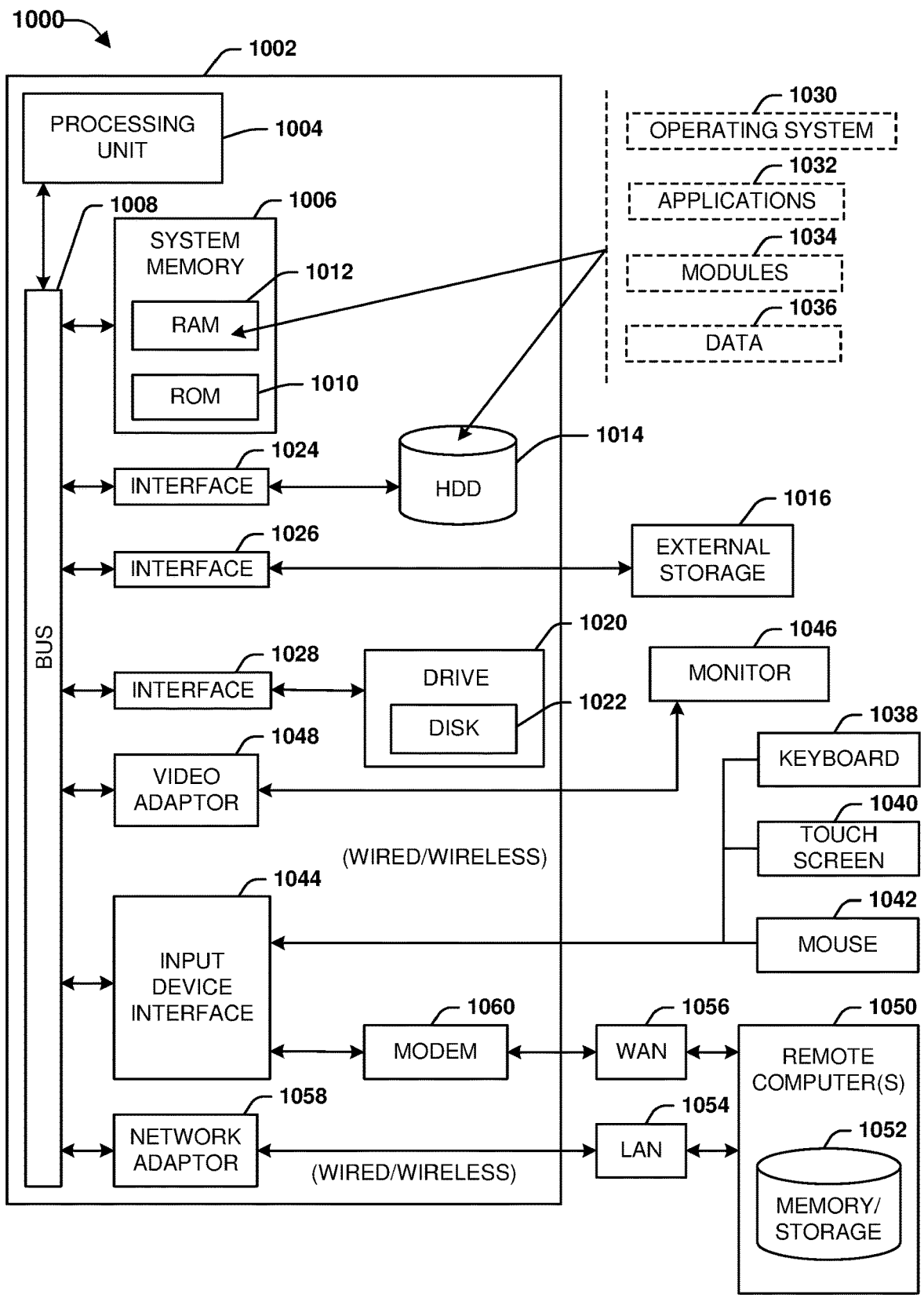
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   identifying, by routing equipment comprising a processor, a transmission profile for a data item for transmission to a destination node via a network, wherein the transmission profile comprises transmission parameters comprising an availability importance parameter applicable to an availability of the data item by the destination node, a security importance parameter applicable to a security applicable to transmission, and a priority value for the data item;
   segmenting, by the routing equipment, the data item into data segments comprising a first data segment and a second data segment; and
   based on the transmission profile, selecting, by the routing equipment, a first network route and a second network route for a transmission of the data segments.

2. The method of claim 1, further comprising, based on the transmission profile, routing, by the routing equipment, the first data segment to be transmitted via the first network route and the second data segment to be transmitted via the second network route.

3. The method of claim 2, wherein the routing is based on the security importance parameter being determined to have an importance value above an availability threshold of importance.

4. The method of claim 1, further comprising:
   identifying, by the routing equipment, a security level of the first network route, and
   based on the security level, selecting, by the routing equipment, an encryption level for selected data segments of the data segments that were selected to be transmitted via the first network route.

5. The method of claim 4, wherein the encryption level was selected further based on the security importance parameter.

6. The method of claim 1, further comprising, based on the transmission profile, routing, by the routing equipment, the data segments to be transmitted via both the first network route and the second network route.

7. The method of claim 6, wherein the routing is based on the availability importance parameter being determined to have an importance value above an availability threshold of importance.

8. The method of claim 1, wherein the availability importance parameter comprises a latency importance parameter.

9. The method of claim 1, wherein the availability importance parameter comprises a recovery importance parameter applicable to recovery of network resources usable for transmission.

10. The method of claim 1, wherein segmenting the data item into the data segments comprises selecting a size for the first data segment based on the transmission profile.

11. The method of claim 1, wherein the transmission profile was identified based on historical performance data for other data items determined to be similar to the data item.

12. The method of claim 1, wherein the data item further comprises an application label that identifies an application related to the data item, and wherein the transmission profile was identified based on the application label.

13. The method of claim 12, wherein, based on the application label, the transmission profile comprises a first transmission parameter of the transmission parameters applicable to the first data segment that is different from a second transmission parameter of the transmission parameters applicable to the second data segment.

14. The method of claim 1, wherein the transmission profile comprises a verification procedure to be applied by the destination node to verify the transmission of the data segments.

15. The method of claim 14, wherein the verification procedure is selected based on the availability importance parameter of the transmission profile.

16. The method of claim 1, wherein a first portion of the first network route traverses a first network slice, and a second portion of the second network route travers a second network slice.

17. A network device, comprising:
    a processor; and
    a memory that stores executable instructions that, when executed by the processor, facilitate performance of operations, comprising:
      sending, to a routing controller device, content data representative of content, device data representative of a destination device, and profile data representative of a routing profile for the content data comprising a data protection value applicable to protection of the content data, a data replication value applicable to replication of the content data, and a priority value for the content; and
      receiving a confirmation message from the routing controller device that the content data was divided into data portions that were communicated to the destination device via network routes selected based on the routing profile.

18. The network device of claim 17, wherein the data portions were distributed to the network routes based on the data protection value and the data replication value, and wherein redundancy of a transmission of the data portions was based on the data replication value and data encryption of the data portions was based on the data protection value.

19. A non-transitory machine-readable medium comprising executable instructions that, when executed by a processor of transmission controller equipment, facilitate performance of operations, the operations comprising:

based on an analysis of network content, identifying a specification for the network content that comprises a latency parameter, a security parameter, and priority value for the network content;

dividing the network content into data packets comprising a first data packet and a second data packet; and based on the specification, routing respective data packets via one or both of a first network path to destination equipment and a second network path to the destination equipment.

20. The non-transitory machine-readable medium of claim 19, wherein the routing comprises:

based on the security parameter, encrypting the respective data packets based on a specified encryption rate, and based on the latency parameter and an estimated transmission speed of the first network path, selecting the first network path for the routing of the respective data packets.

* * * * *